US009495592B2

(12) United States Patent
Sakamoto

(10) Patent No.: US 9,495,592 B2
(45) Date of Patent: Nov. 15, 2016

(54) IMAGE-BASED INFORMATION PROVIDING DEVICE AND METHOD USING OBJECT RECOGNITION

(71) Applicant: YAHOO JAPAN CORPORATION, Tokyo (JP)

(72) Inventor: Ryuki Sakamoto, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 231 days.

(21) Appl. No.: 13/934,903

(22) Filed: Jul. 3, 2013

(65) Prior Publication Data

US 2014/0016822 A1    Jan. 16, 2014

(30) Foreign Application Priority Data

Jul. 10, 2012    (JP) .................................. 2012-154732

(51) Int. Cl.
*G06K 9/00* (2006.01)
*G06F 17/30* (2006.01)

(52) U.S. Cl.
CPC ..... *G06K 9/00624* (2013.01); *G06F 17/30047* (2013.01)

(58) Field of Classification Search
None
See application file for complete search history.

(56) References Cited

U.S. PATENT DOCUMENTS

| 7,712,123 B2 * | 5/2010 | Miyaoku et al. ............. 725/109 |
| 8,374,914 B2 * | 2/2013 | Valencia-Campo . G06K 9/6229 |
| | | 382/218 |
| 8,559,724 B2 * | 10/2013 | Choi et al. ................... 382/190 |
| 8,718,383 B2 * | 5/2014 | Valencia-Campo G06F 17/30256 |
| | | 382/181 |

(Continued)

FOREIGN PATENT DOCUMENTS

| JP | A-2000-090107 | 3/2000 |
| JP | A-2011-34481 | 2/2011 |
| JP | A-2012-048324 | 2/2014 |

OTHER PUBLICATIONS

Miyamori, et al., "A New Way of Content Viewing Based on the Fusion of TV Programs and Web Content," *ITE Technical Report*, Sep. 8, 2005, vol. 29, No. 49, pp. 89-94 (with English abstract).

(Continued)

*Primary Examiner* — Jason Heidemann
(74) *Attorney, Agent, or Firm* — Oliff PLC

(57) ABSTRACT

An information providing device according to the exemplary embodiment includes an object recognizing unit, a retrieving unit, an obtaining unit, and a transmitting unit. The object recognizing unit extracts an image of a specific object which appears in an image of a moving image content to be distributed to a terminal device. The retrieving unit requests a retrieval device to retrieve a similar image with the image of the specific object as a retrieval key and obtains a retrieval result from the retrieval device. The obtaining unit obtains recommend information related with an image of the spe- (Continued)

cific object which appears in an image of a moving image content based on the retrieval result. The transmitting unit transmits the recommend information to the terminal device.

14 Claims, 7 Drawing Sheets

(56) References Cited

U.S. PATENT DOCUMENTS

| | | | |
|---|---|---|---|
| 9,032,447 B1* | 5/2015 | Caidar | H04N 21/47805 725/109 |
| 2006/0230123 A1* | 10/2006 | Simmons | G06Q 30/0603 709/219 |
| 2006/0236243 A1* | 10/2006 | Brain | H04N 7/17336 715/704 |
| 2006/0242681 A1* | 10/2006 | Brain | H04N 21/2225 725/109 |
| 2008/0046920 A1* | 2/2008 | Bill | G06Q 30/02 725/34 |
| 2008/0177640 A1* | 7/2008 | Gokturk | G06Q 30/02 705/26.62 |
| 2008/0285890 A1* | 11/2008 | Han et al. | 382/305 |
| 2009/0006208 A1* | 1/2009 | Grewal | G06Q 30/02 705/14.61 |
| 2009/0006375 A1* | 1/2009 | Lax | H04N 21/435 |
| 2009/0172730 A1* | 7/2009 | Schiff | G06Q 30/02 725/34 |
| 2010/0036883 A1* | 2/2010 | Valencia-Campo | G06K 9/6229 705/14.49 |
| 2010/0048242 A1* | 2/2010 | Rhoads et al. | 455/556.1 |
| 2010/0246959 A1* | 9/2010 | Choi et al. | 382/176 |
| 2010/0329547 A1* | 12/2010 | Cavet | G06F 17/30802 382/164 |
| 2011/0251903 A1* | 10/2011 | Ryu et al. | 705/14.73 |
| 2012/0239469 A1* | 9/2012 | Steinberg | G06Q 30/0241 705/14.4 |
| 2013/0014155 A1* | 1/2013 | Clarke | G06F 17/30026 725/32 |
| 2013/0031582 A1* | 1/2013 | Tinsman | H04N 21/2353 725/36 |

OTHER PUBLICATIONS

Office Action issued in Japanese Application No. 2012-154732 mailed Feb. 25, 2014 (with translation).

* cited by examiner

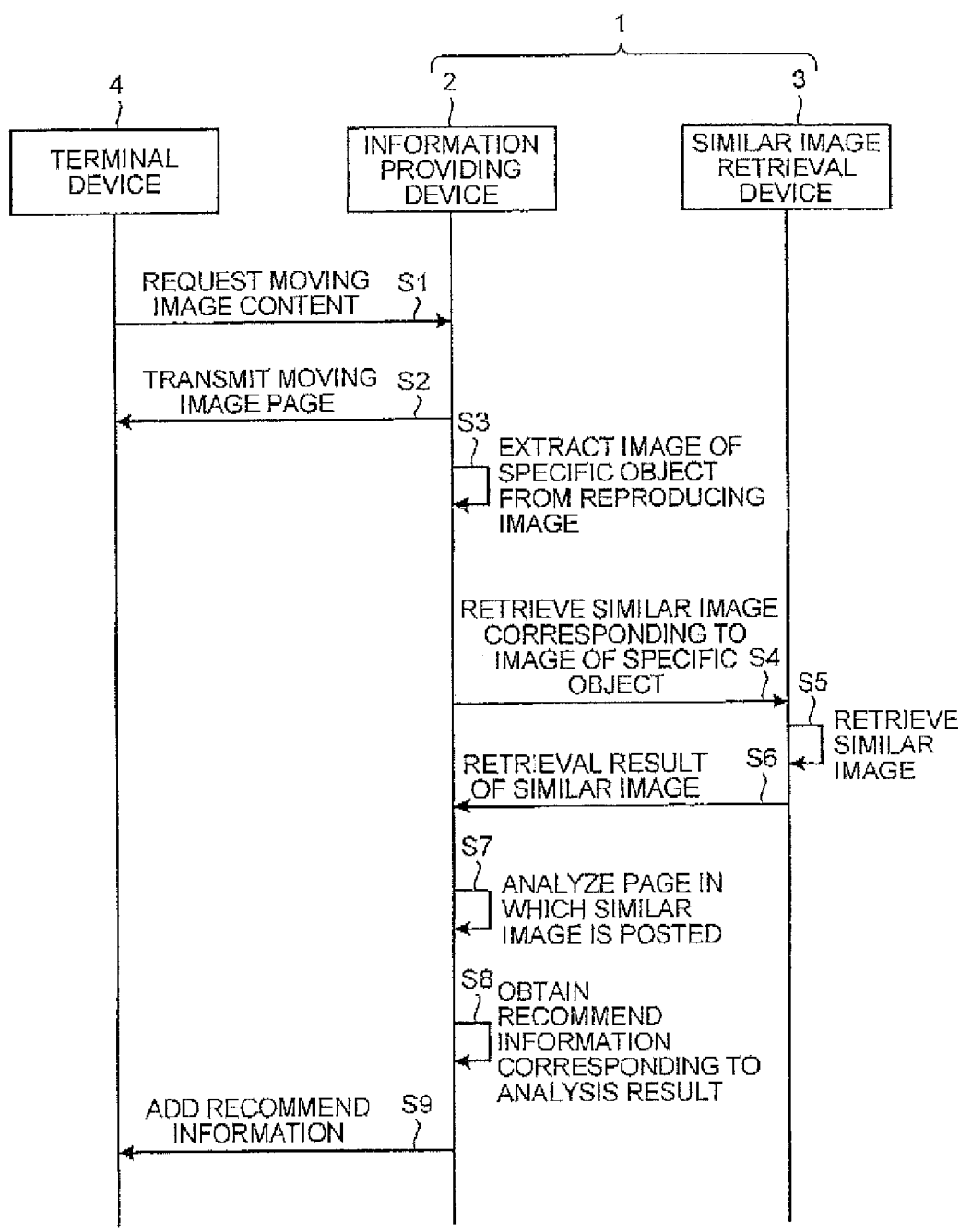

FIG.8

| CONTENT ID | REPRODUCING POSITION | SPECIFIC OBJECT INFORMATION ||
|---|---|---|---|
| | | NAME | IMAGE STORED POSITION |
| 10001 | 2:03 TO 2:21 | SHOES | /10001/image1/ |
| | 3:19 TO 3:54 | WATCH | /10001/image2/ |
| | ⋮ | ⋮ | ⋮ |
| 10002 | 4:31 TO 4:40 | VEHICLE | /10002/image1/ |
| | 5:03 TO 5:53 | BAG | /10002/image2/ |
| | ⋮ | ⋮ | ⋮ |
| ⋮ | ⋮ | ⋮ | ⋮ |

IMAGE-BASED INFORMATION PROVIDING DEVICE AND METHOD USING OBJECT RECOGNITION

CROSS-REFERENCE TO RELATED APPLICATIONS

The present application claims priority to and incorporates by reference the entire contents of Japanese Patent Application No. 2012-154732 filed in Japan on Jul. 10, 2012.

BACKGROUND OF THE INVENTION

1. Field of the Invention

The present invention relates to an information providing device and an information providing method.

2. Description of the Related Art

In the related art, in accordance with high speed and large capacity internet connection environment such as an ADSL or an optical fiber, that is, the spread of a broadband, a moving image distribution service which distributes a moving image content such as a drama or a movie to a terminal device which is represented by a personal computer has been developed.

In such a moving image distribution service, a technique which associates a keyword related with a reproducing image of the moving image content to a reproducing time and displays an advertisement in a terminal device which is reproducing the moving image content, based on a keyword corresponding to the reproducing time is known (for example, see Japanese Laid-open Patent Publication No. 2011-034481).

However, in the moving image distribution service of the related art, it is required to associate the reproducing time of the moving image content to the keyword. If such a process is manually performed, there is also a problem in cost so that it is not desirable. Therefore, it is considered to recognize an object in the moving image content using an object recognizing technique to extract a keyword corresponding to the reproducing time.

However, such an object recognizing technique may figure out abstract information such as a "vehicle" or a "person" but cannot figure out detailed information such as a specific "type of vehicle" or "name of a person" of the object. Therefore, even when the information of the object is extracted by the object recognizing technique, it is difficult to present appropriate recommend information corresponding to the reproducing time of the moving image content to a user.

SUMMARY OF THE INVENTION

According to the exemplary embodiment, an information providing device includes an object recognizing unit, a retrieving unit, an obtaining unit, and a transmitting unit. The object recognizing unit extracts an image of a specific object which appears in an image of a moving image content to be distributed to a terminal device. The retrieving unit requests a retrieval device to retrieve a similar image with the image of the specific object as a retrieval key and obtains a retrieval result from the retrieval device. The obtaining unit obtains recommend information related with an image of the specific object which appears in an image of a moving image content based on the retrieval result. The transmitting unit transmits the recommend information to the terminal device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1A is a diagram illustrating a flow of an information providing process according to an exemplary embodiment;

FIG. 8 is a diagram illustrating an example of a specific object table.

DETAILED DESCRIPTION OF THE PREFERRED EMBODIMENTS

Hereinafter, a mode for carrying out an information providing device, an information providing method, and an information providing program according to this application (hereinafter, referred to as an "exemplary embodiment") will be described in detail with reference to the drawings. However, the information providing device, the information providing method, and the information providing program according to this application are not limited to the exemplary embodiment.

1. Information Providing Process

Figure 1B:
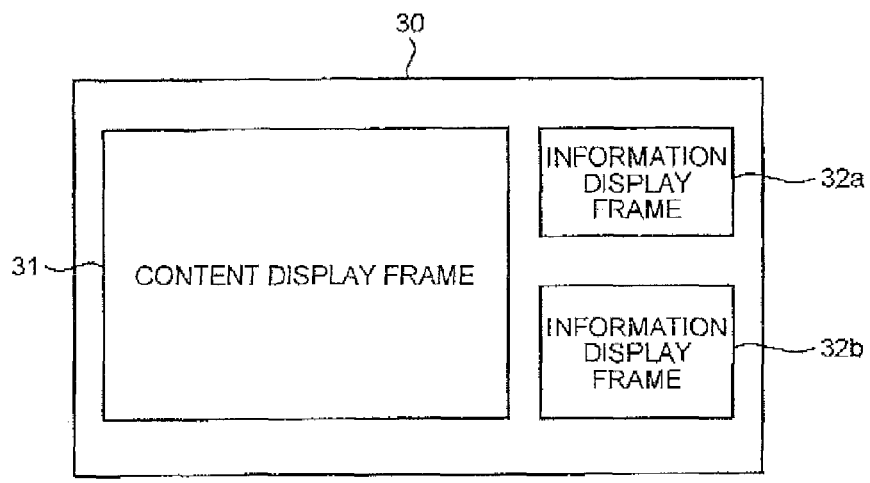
FIG. 1B is a diagram illustrating an example of a moving image page which is provided from an information providing device according to the exemplary embodiment.
Figure 1C:
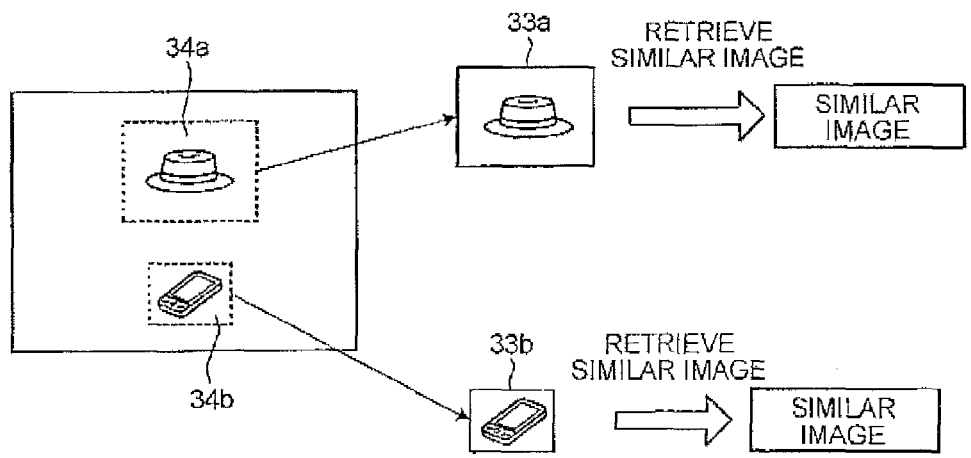
FIG. 1C is a diagram illustrating an example of information processing by the information providing device according to the exemplary embodiment.

An information providing process according to an exemplary embodiment will be described. FIG. 1A is a diagram illustrating a flow of an information providing process and FIG. 1B is a diagram illustrating an example of a moving image page which is provided from an information providing device. Further, FIG. 1C is a diagram illustrating an example of information processing by the information providing device.

As illustrated in FIG. 1A, an information providing system 1 according to an exemplary embodiment includes an information providing device 2 and a similar image retrieval device 3 and distributes a moving image page including a moving image content and recommend information to a terminal device 4. The information providing device 2, the similar image retrieval device 3, and the terminal device 4 are connected to each other through a communication network.

Further, as illustrated in FIG. 1B, in a moving image page 30 which is distributed from the information providing system 1, a content display frame 31 through which the moving image content is displayed and information display frames 32*a* and 32*b* through which recommend information is displayed are disposed. Hereinbelow, in some cases, the information display frames 32*a* and 32*b* are collectively referred to as an information display frame 32. Further, a position, a number, and a size of the information display frame 32 may be appropriately changed.

The moving image content is, for example, a content of a moving image such as a drama, a movie, or a promotional video and is distributed in a streaming format. Further, the recommend information is, for example, information regarding a product or a service or advertising information and is information which is recommended (suggested) to a user.

The recommend information which is allocated to the information display frame 32 is recommend information corresponding to an image of the moving image content which is reproduced in the terminal device 4 and is transmitted to the terminal device 4 as described below. The recommend information may include various information such as advertising information including a banner advertisement or animation advertisement and information on a recommended product/service and the information is represented, for example, as a still image, a moving image, or a text.

As illustrated in FIG. 1A, first, in step S1, the terminal device 4 requests a moving image content to the information providing device 2. If the information providing device 2 obtains the moving image content request from the terminal device 4, in step S2, the information providing device 2 transmits the moving image page 30 including a moving image content in accordance with the request to the terminal device 4 which is a requesting source.

If the terminal device 4 obtains the moving image page 30 from the information providing device 2, the terminal device 4 displays the moving image page 30 on a display unit to start to reproduce the moving image content. Further, recommend information, for example, based on a detail of the moving image content (for example, a title, a synopsis, an actor or actress, a director, a staff, a production company, or a sponsor) is initially set in the information display frame 32.

When the distribution of the moving image page 30 starts, the information providing device 2 performs an image recognizing process of a specific object (corresponding to an example of a specific object) of objects which appear in an image of a moving image content which is being distributed to the terminal device 4. When an image of the specific object is recognized, in step S3, the information providing device 2 extracts the image of the specific object from the image of the moving image content.

Next, in step S4, the information providing device 2 requests the similar image retrieval device 3 to retrieve a similar image with the extracted image of the specific object as a retrieval key. Here, as illustrated in FIG. 1C, it is considered that the image of the moving image content which is being reproduced in the terminal device 4 (hereinafter, referred to as a reproducing image) includes images 33*a* and 33*b* of specific objects 34*a* and 34*b*. In this case, the information providing device 2 extracts the images 33*a* and 33*b* of the specific objects and requests the similar image retrieval device 3 to retrieve the similar image with the images 33*a* and 33*b* of the specific objects as retrieval keys.

If there is a retrieval request of the similar image with the images 33*a* and 33*b* of the specific objects as retrieval keys from the information providing device 2, the similar image retrieval device 3 retrieves images which are similar to the images 33*a* and 33*b* of the specific objects in step S5, and transmits a retrieval result to the information providing device 2 in step S6. If the information providing device 2 obtains the retrieval result from the similar image retrieval device 3, the information providing device 2 obtains recommend information related with the images 33*a* and 33*b* of the specific objects based on the retrieval result.

The retrieval result of the similar image retrieval device 3 includes, for example, a list of information in which an address of the similar image is associated with an address of a web page in which the similar image is posted. The information providing device 2 collects information on the web page in which the similar image is posted, through the communication network. Further, the information providing device 2 analyzes contents which are common in the information on the collected web page in step S7 and obtains the recommend information corresponding to the analysis result as recommend information which is related with the images 33*a* and 33*b* of the specific objects in step S8.

For example, it is considered that the information which is common in the web page in which the similar images of the specific objects 34*a* and 34*b* are posted is a "hat with a product No. All manufactured by a company A" and a "D11 type of smart phone manufactured by a company D". In this case, the information providing device 2 obtains recommend information (for example, a part of a banner advertisement linked to a web page of the corresponding manufacturing company and a product page of a corresponding shopping site) corresponding to the "hat with a product No. All manufactured by a company A" and the "D11 type of smart phone manufactured by a company D".

Next, in step S9, the information providing device 2 transmits the obtained recommend information to the terminal device 4. The terminal device 4 which receives the recommend information displays the recommend information on the information display frame 32. By doing this, it is possible to present appropriate recommend information corresponding to an image of the moving image content to the user. Hereinafter, the information providing system 1 according to the present exemplary embodiment will be further specifically described.

2. Configuration of Information Providing Device

Figure 2:
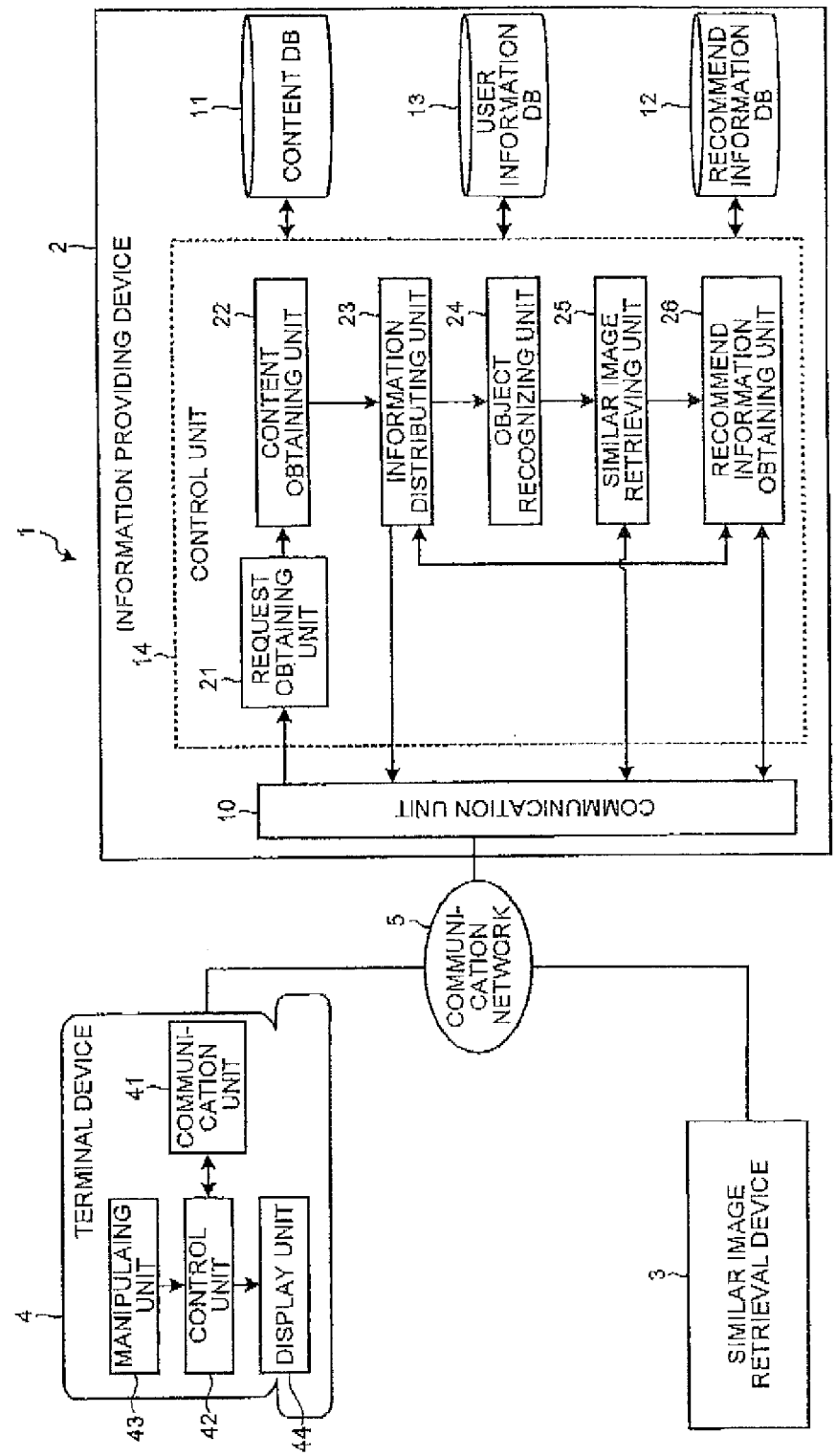
FIG. 2 is a diagram illustrating a configuration example of an information providing device according to the exemplary embodiment.

Next, a configuration of the information providing device 2 will be specifically described. FIG. 2 is a diagram illustrating a configuration example of the information providing device 2 according to the exemplary embodiment. As described in FIG. 2, the information providing device 2 includes a communication unit 10, a content database 11, a recommend information database 12, a user information database 13, and a control unit 14. Hereinafter, the database is abbreviated as DB.

The communication unit 10 is connected to a communication network 5 and transmits and receives information between the similar image retrieval device 3 and the terminal device 4 through the communication network 5. The communication unit 10 performs the connection with the communication network 5 through a cable or wirelessly.

The content DB 11, the recommend information DB 12, and the user information DB 13 are, for example, semiconductor memory devices such as a random access memory (RAM) or a flash memory or storage devices such as a hard disk or an optical disk. A plurality of moving image contents are stored in the content DB 11 and a plurality of items of recommend information are stored in the recommend information DB 12. Further, attribute information of the user is stored in the user information DB 13.

The control unit 14 is implemented by an integrated circuit such as an application specific integrated circuit (ASIC) or a field programmable gate array (FPGA). Further, the control unit 14 is implemented by executing a program which is stored in an internal storage device using the RAM as a working area, by a central processing unit (CPU) or a micro processing unit (MPU).

The control unit 14 includes a request obtaining unit 21, a content obtaining unit 22, an information distributing unit 23, an object recognizing unit 24, a similar image retrieving unit 25, and a recommend information obtaining unit 26 and implements or executes an information processing function or operation which will be described below. An internal configuration of the control unit 14 is not limited to the above-described configuration and may have another configuration if the configuration performs the information processing which will be described below.

The information distributing unit 23 corresponds to an example of a "transmitting unit" and the object recognizing unit 24 corresponds to an example of an "object recognizing unit". Further, the similar image retrieving unit 25 corresponds to an example of a "retrieving unit" and the recommend information obtaining unit 26 corresponds to an example of an "obtaining unit", a "selection information transmitting unit", a "selection result obtaining unit", and a "recommend information obtaining unit".

Request Obtaining Unit

The request obtaining unit 21 obtains a moving image content request which is transmitted from the terminal device 4 through the communication unit 10. The moving image content request, for example, is transmitted from a control unit 42 of the terminal device 4 through a communication unit 41 when the user manipulates a moving image selection page (not illustrated) using a manipulating unit 43. Further, the moving image selection page is a web page which is transmitted from the information distributing unit 23, for example, when the terminal device 4 accesses the information providing device 2, and is displayed on a display unit 44 of the terminal device 4.

Content Obtaining Unit

The content obtaining unit 22 obtains the moving image content from the content DB 11 based on the moving image content request obtained by the request obtaining unit 21 and outputs the obtained moving image content to the information distributing unit 23. The moving image content request includes identification information of the moving image content and the moving image content is obtained by the content obtaining unit 22 based on the identification information.

Information Distributing Unit

The information distributing unit 23 creates the moving image page 30 (see FIG. 1B) including the moving image content corresponding to the moving image content request and transmits the created moving image page to the terminal device 4, which is a requesting source, through the communication unit 10. The moving image content is allocated to the content display frame 31 of the moving image page 30 and distributed to the terminal device 4 in a streaming format.

Further, in the information display frame 32 of the moving image page 30, for example, recommend information based on a detail of the moving image content displayed on the content display frame 31 is set. Information representing a detail of the moving image content (hereinafter, referred to as a content detail information) other than the moving image data is associated with the moving image content stored in the content DB 11. Further, as the content detail information, for example, a title, a synopsis, an actor or actress, a director, a staff, a production company, or a sponsor is included.

The information distributing unit 23 requests the recommend information obtaining unit 26 to obtain the recommend information in accordance with the content detail information. The information distributing unit 23 allocates the recommend information output from the recommend information obtaining unit 26 to the information display frame 32 to create the moving image page 30.

The recommend information obtaining unit 26 obtains information of an advertising banner having a web page which includes information of a product or a service provided by the sponsor as a link destination from the recommend information DB 12, as the recommend information in accordance with the content detail information. Further, for example, information related with the synopsis (for example, in the case of a moving image content regarding the soccer, advertisement of a soccer wear or a soccer shoes) may be obtained from the recommend information DB 12.

Figure 3:
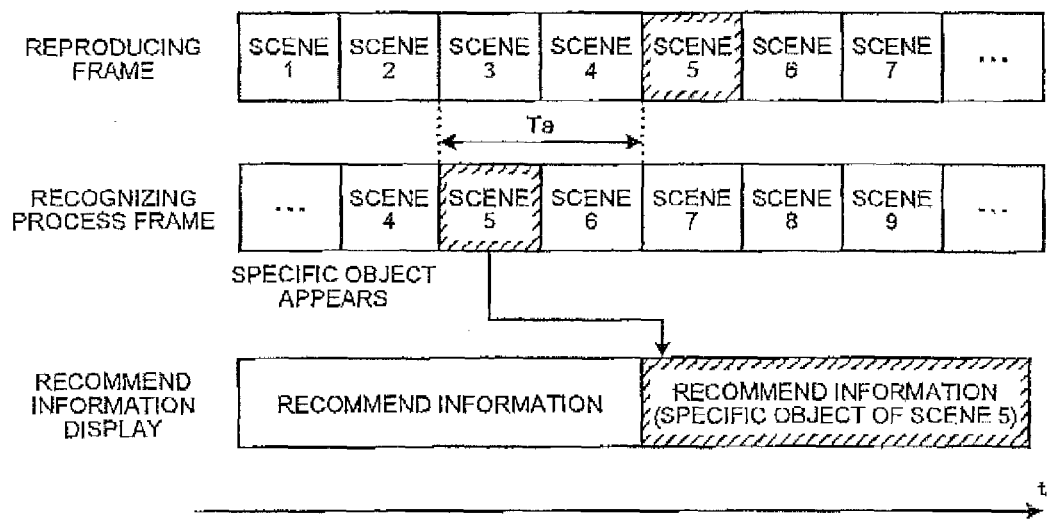
FIG. 3 is a diagram illustrating a relation between a reproducing timing of a terminal device and a processing timing of an object recognizing unit.

Further, the information distributing unit 23 outputs image data of the moving image content to the object recognizing unit 24 in synchronization with the reproduction of the moving image content in the terminal device 4. In this case, as illustrated in FIG. 3, the information distributing unit 23, for example, sequentially outputs image data which is reproduced in the terminal device 4 after a predetermined time Ta, among the image data of the moving image content, to the object recognizing unit 24. FIG. 3 is a diagram illustrating a relation between a reproducing timing of the terminal device 4 and a processing timing of the object recognizing unit 24.

Referring to FIG. 3, a "reproducing frame" indicates an order of frames which are reproduced in the terminal device 4 and a "recognizing process frame" indicates an order of frames which are processed in the object recognizing unit 24. Further, each scene is configured by a predetermined number of frames. An example of FIG. 3 illustrates that an object which is specified by a frame of a "scene 5" appears.

The image data which is reproduced in the terminal device 4 after the predetermined time Ta is output from the information distributing unit 23 to the object recognizing unit 24 because a processing time which is required to transmit the recommend information to the terminal device 4 is considered. By doing this, as illustrated in FIG. 3, at a timing when an image of a specific object appears in an image which is being reproduced in the terminal device 4, corresponding recommend information may be displayed in the terminal device 4.

Object Recognizing Unit

The object recognizing unit 24 extracts an image of a specific object which appears in the image of the moving image content which is reproduced in the terminal device 4, from the image data output from the information distributing unit 23. The specific object is an object to which the user of the terminal device 4 expresses an interest, among the objects included in the moving image content and is set in advance in the object recognizing unit 24.

For example, among the objects included in the moving image content, an object regarding a product or a service is defined as a specific object. As the object regarding a product or a service, for example, there is an object (for example, shoes, clothes, a bag, a watch, accessories, or a vehicle) which indicates a product itself or an object (for example, a shop such as a restaurant or a hair shop) which indicates a building which provides a service.

Figure 4:
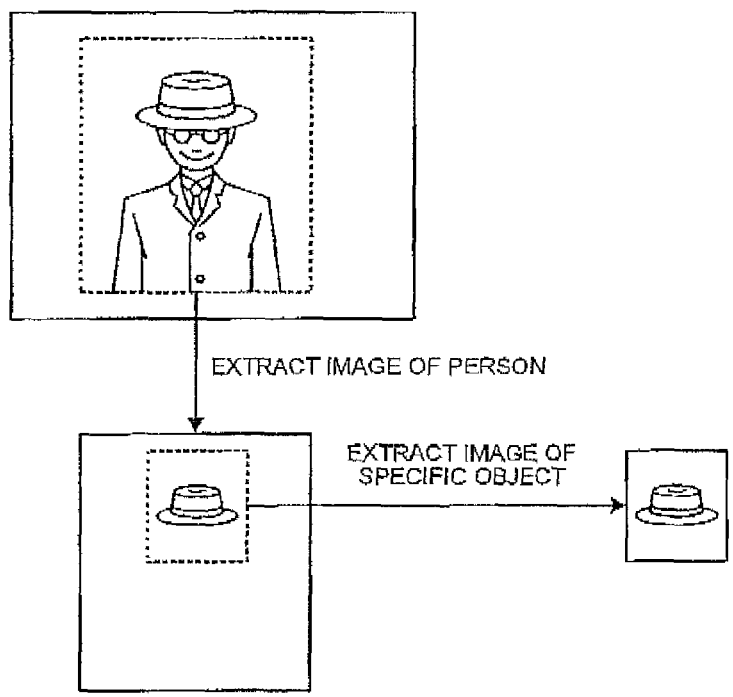
FIG. 4 is a diagram illustrating a flow of an extracting process of a specific object.

FIG. 4 is a diagram illustrating a flow of an extracting process of a specific object. As illustrated in FIG. 4, when an image of the specific object is extracted, the object recognizing unit 24, first, identifies a person from the object which appears in the image of the moving image content. The image of the person which is recognized by the object recognizing unit 24 includes an image of an object which is possessed by the person. The object recognizing unit 24 extracts the image of the specific object from an image of the identified person.

As described above, the image of the specific object is extracted after extracting the image of the person so that the specific object may be easily extracted. Further, an item which is possessed by a character in a drama or a movie may be an item in which the user of the terminal device 4 who is a viewer is interested in many cases. Further, the item is considered as the specific object so that efficient recommend information may be presented to the user of the terminal device 4. Further, the object recognizing unit 24 may directly extract the image of the specific object without extracting the image of the person.

Here, a process in the object recognizing unit 24 will be specifically described. In the object recognizing unit 24, first dictionary data in which information of a feature vector of the person is set and second dictionary data in which a name of each of specific objects, such as shoes, clothes, a bag, or a vehicle and information of the feature vector form a pair are stored. As the feature vector, for example, there is a contour or the number of used colors.

The object recognizing unit 24 determines an area including an image of the person from the image data (hereinafter, referred to as an input image) input from the information distributing unit 23 based on the first dictionary data. In such a process, the object recognizing unit 24 scans the input image and determines whether there is an image having a feature vector that has a distance from the feature vector of the person set in the first dictionary data which is equal to or smaller than a predetermined value. If it is determined that the image of the person is present in the input image, the object recognizing unit 24 extracts the image of the person (hereinafter, referred to as a person area image) from the input image.

Further, the object recognizing unit 24 determines the image of the specific object from the person area image based on the second dictionary data. In such a process, the object recognizing unit 24 scans the person area image and determines whether there is an image having a feature vector that has a distance from the feature vector of each of the specific objects set in the second dictionary data which is equal to or smaller than a predetermined value. If it is determined that the image of the specific object is present in the person area image, the object recognizing unit 24 extracts the image of the specific object from the person area image and outputs the extracted image to the similar image retrieving unit 25.

The object recognizing unit 24 may perform the extracting process of the specific object on every frame of the input image or every several frames. However, if it is determined that a variation of the input images between the frames is equal to or larger than a predetermined value, the object recognizing unit 24 may perform the extracting process of the specific object. By doing this, a processing load may be reduced.

Further, the object recognizing unit 24 may restrict the specific object which is an identification target to a part of specific objects set in the second dictionary data, in accordance with attribute information (for example, a gender, an age, an address, or a taste) of the user of the terminal device 4. In the user information DB 13, a user ID, a cookie ID, and attribute information of the user are stored so as to be associated with each other and the information distributing unit 23 obtains the attribute information of the user from the user information DB 13 based on the user ID or the cookie ID transmitted from the terminal device 4 and outputs the attribute information to the object recognizing unit 24.

The object recognizing unit 24 stores the specific object and the attribute information so as to be associated with each other and restricts the specific object which is an identification target in accordance with the attribute information output from the o information distributing unit 23. For example, if the user is a "male", a specific object which excludes an object for female only such as cosmetics or hair accessories becomes an identification target.

As described above, by restricting the specific object of the identification target in accordance with the attribute information of the user of the terminal device 4, a processing load for identifying the object may be reduced and extraction of a specific object in which the user of the terminal device 4 is less interested may be suppressed.

Similar Image Retrieving Unit

The similar image retrieving unit 25 requests the similar image retrieval device 3 to retrieve the similar image with an image of the specific object extracted by the object recognizing unit 24 as a retrieval key and obtains a retrieval result from the similar image retrieval device 3.

Specifically, the similar image retrieving unit 25 requests the similar image retrieval device 3 to retrieve the similar image with the images of the specific objects which are continuously extracted by the object recognizing unit 24 for a predetermined period as a retrieval key. Further, the similar image retrieving unit 25 may have an image of a specific object which appears in the image of the moving image content only for one frame as a retrieval key.

If the similar image retrieval device 3 obtains a retrieval request for the similar image from the information providing device 2, the similar image retrieval device 3 retrieves the similar image with the image of the specific object included in the retrieval request as a retrieval key. The similar image retrieval device 3 associates information on an image posted in a web page on the communication network 5 with an address (for example, an IP address or a URL) of a web page of a posting source so as to be stored in an internal DB and retrieves the similar image from the DB.

The similar image is retrieved in such a manner that, for example, feature vectors of the image are compared and it is determined that feature vectors having a distance therebetween which is equal to or smaller than a predetermined value are similar. Further, as the feature vector of the image, for example, there is a contour or the number of used colors.

The similar image retrieval device 3 extracts information (hereinafter, referred to as similar image information) including an image which is similar to the image of the specific object included in the retrieval request and an address of a posting source web page from an internal DB. The number of items of extracted similar image information is the number which is set in advance by the similar image retrieval device 3 or the number which is designated by the retrieval request and the similar image information is selected from the information having the highest similarity of the image in the order of similarity. Further, the similar image retrieval device 3 may extract all similar image information having a distance between the feature vectors which is equal to or smaller than a predetermined value as the similar image information to be extracted.

The similar image retrieval device 3 transmits the similar image information extracted as described above to the information providing device 2 as a retrieval result. The similar image retrieving unit 25 of the information providing device 2 obtains the similar image information transmitted from the similar image retrieval device 3 and outputs the obtained similar image information to the recommend information obtaining unit 26.

The recommend information obtaining unit 26 obtains recommend information related with the image of the specific object which appears in the image of the moving image content which is being reproduced in the terminal device 4, based on the retrieval result of the similar image obtained by the similar image retrieving unit 25.

Specifically, the recommend information obtaining unit 26 collects a posting source web page of the similar images through the communication unit 10, based on the address included in the similar image information. The recommend information obtaining unit 26 determines a product or a service which is common in information of the collected web pages and sequentially extracts names of a predetermined number (for example, five) of products or services from a name having the largest number of common posting source web pages as information of recommend candidate.

The recommend information obtaining unit 26 outputs the extracted information of recommend candidate to the information distributing unit 23. When the information of the recommend candidate is obtained, the information distributing unit 23 creates selection information and transmits the created selection information to the terminal device 4. The terminal device 4 displays the received selection information on the display unit 44.

The selection information is information for allowing the user to select a desired candidate from the recommend candidates. For example, a "hat with a product No. A11 manufactured by a company A", a "hat with a product No. A12 manufactured by a company A", a "hat with a product No. B11 manufactured by a company B", a "hat with a product No. B12 manufactured by a company B" and a "hat with a product No. C11 manufactured by a company C" are extracted as recommend candidates.

Figure 5:
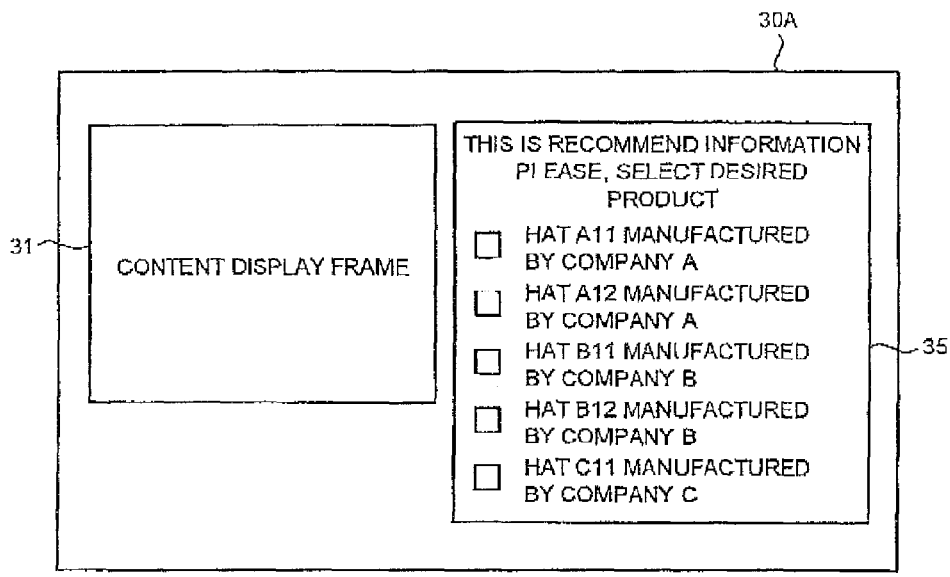
FIG. 5 is a diagram illustrating an example of a moving image page which includes selection information.

In this case, a moving image page 30A which includes selection information 35 as described in FIG. 5 is displayed on the display unit 44 of the terminal device 4. FIG. 5 is a diagram illustrating an example of the moving image page 30A which includes the selection information 35. As illustrated in FIG. 5, as the selection information 35, information of the recommend candidate is displayed in the format of a check box. In the moving image page 30A, the selection information 35 is displayed-instead of the information display frame 32.

When the user of the terminal device 4 selects a recommend candidate by manipulating the manipulating unit 43, the control unit 42 transmits a selection result to the information providing device 2. For example, as illustrated in FIG. 5, when the selection information 35 is displayed on the display unit 44, if the user selects a check box of the "hat with a product No. A11 manufactured by a company A", identification information of the "hat with a product No. A11 manufactured by a company A" is transmitted from the terminal device 4 to the information providing device 2 as the selection result.

When the selection result is obtained from the terminal device 4, the recommend information obtaining unit 26 of the information providing device 2 obtains the recommend information corresponding to the selection result from the recommend information DB 12. Further, the recommend information may be obtained from a server which is not illustrated.

Here, the identification information of the "hat with a product No. A11 manufactured by a company A" is transmitted from the terminal device 4 to the information providing device 2 as the selection result. In this case, the recommend information obtaining unit 26, for example, obtains a banner advertisement having a web page of a shopping site which sells the "hat with a product No. A11 manufactured by a company A" as a link destination from the recommend information DB 12.

Further, the recommend information obtaining unit 26 may also obtain a banner advertisement having a web page of a manufacturing company which manufactures the "hat with a product No. A11 manufactured by a company A" as a link destination from the recommend information DB 12.

Further, the recommend information obtaining unit 26, for example, accesses a retrieving device which is not illustrated with the "hat with a product No. All manufactured by a company A" as a retrieval key and creates the recommend information based on such a retrieval result. In this case, the recommend information obtaining unit 26, for example, extracts a price or an image of the "hat with a product No. All manufactured by a company A" from the web page of the shopping site and considers the extracted information as recommend information.

When the recommend information is obtained, the recommend information obtaining unit 26 outputs the recommend information to the information distributing unit 23. The information distributing unit 23 transmits the recommend information obtained from the recommend information obtaining unit 26 to the terminal device 4. When the recommend information is received from the information providing device 2, the control unit 42 of the terminal device 4 displays the recommend information on the information display frame 32 (see FIG. 1B) of the moving image page 30 instead of the selection information 35.

Further, the information distributing unit 23 obtains a timing when the object recognizing unit 24 starts to extract the image of the specific object or a timing immediately before the starting timing from the object recognizing unit 24 and transmits timing recommend information to the terminal device 4. By doing this, in the terminal device 4, the recommend information related with the image of the specific object is displayed on the information display frame 32 at a timing when the image of the specific object appears in the reproducing image of the moving image content. However, the display timing is not limited to the above-mentioned timing, but may be varied.

Figure 6:
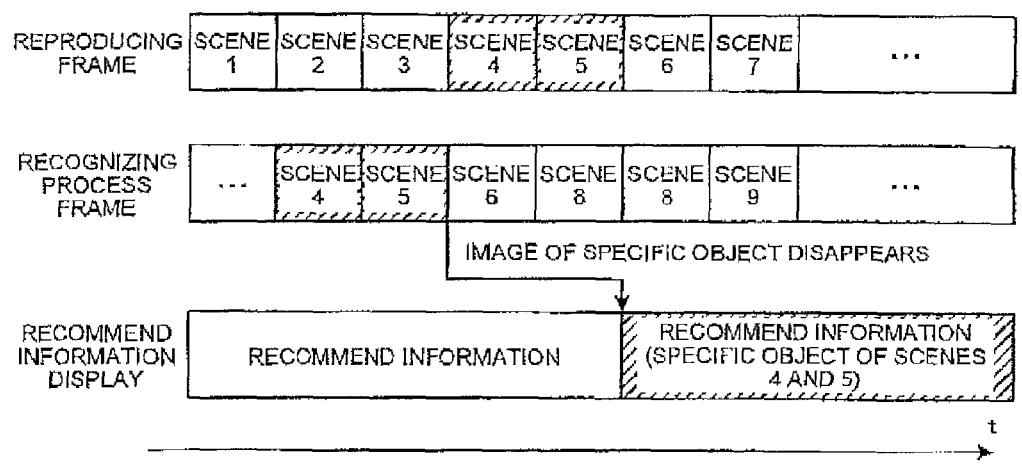
FIG. 6 is a diagram illustrating a relation between a reproducing timing of a terminal device and a processing timing of an object recognizing unit.

For example, as illustrated in FIG. 6, at a timing when the image of the specific object which appears in the reproducing image of the moving image content disappears, the recommend information related with the image of the specific object may be displayed on the information display frame 32. FIG. 6 is a diagram illustrating a relation between a reproducing timing of the terminal device 4 and a processing timing of the object recognizing unit 24, which is similar to FIG. 3.

In this case, the information distributing unit 23 obtains a timing when the image of the specific object is not extracted by the object recognizing unit 24 or a timing immediately before the above timing from the object recognizing unit 24 and transmits recommend information at such a timing to the terminal device 4.

Further, in the above-described example, even though the selection information 35 is created to be transmitted to the terminal device 4, the recommend information may be transmitted to the terminal device 4 without creating the selection information 35. In this case, the recommend information obtaining unit 26 collects a posting source web page of the similar images through the communication unit 10, based on the address included in the similar image information. Therefore, the recommend information obtaining unit 26 determines the product or the service which is common in the information of the collected web page, extracts a name of the product or the service which is the most common in the posting source web pages, and obtains recommend information corresponding to the product or the service from the recommend information DB 12.

3. Processing Flow of Information Providing Device

Figure 7:
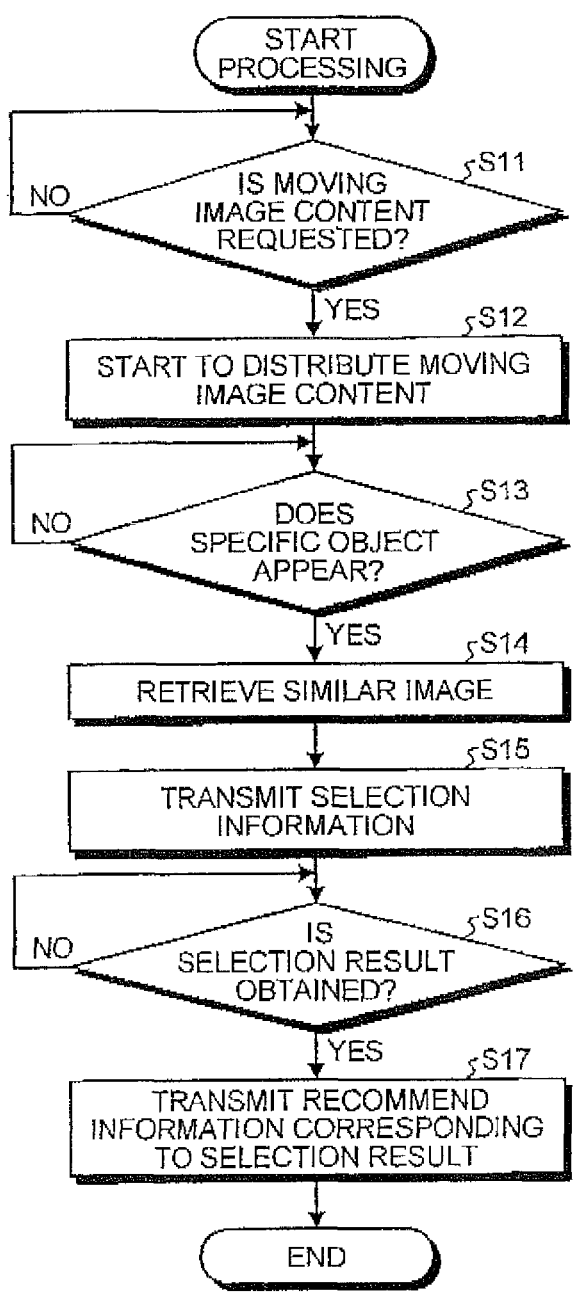
FIG. 7 is a flowchart of information processing by the information providing device according to the exemplary embodiment.

Next, information processing of the information providing device 2 according to an exemplary embodiment will be described with reference to FIG. 7. FIG. 7 is a flowchart of information processing by the information providing device 2 according to the exemplary embodiment.

As illustrated in FIG. 7, in step S11, the control unit 14 of the information providing device 2 determines whether the moving image content request is obtained from the terminal device 4 through the communication unit 10. If it is determined that the moving image content request is obtained (Yes in step S11), the control unit 14 creates the moving image page 30 (see FIG. 1B) including the moving image content to transmits the created moving image page to the terminal device 4 and starts to distribute a streaming of the moving image content in step S12.

If the moving image page 30 is obtained from the information providing device 2, the control unit 42 of the terminal device 4 reproduces the moving image content in the content display frame 31 of the moving image page 30 to display the moving image content on the display unit 44.

The control unit 14 of the information providing device 2 sequentially analyzes images of a frame which is predetermined time earlier than a frame where the moving image content is being reproduced in the terminal device 4, among the frames of the moving image content which is being distributed to the terminal device 4, and determines whether the specific object appears in the image of the moving image content in step S13.

If it is determined that the specific object appears (Yes in step S13), the control unit 14 performs a retrieval request of the similar image on the similar image retrieval device 3 with the image of appearing specific object as a retrieval key and obtains the retrieval result from the similar image retrieval device 3 in step S14. In step S15, the control unit 14 transmits the selection information 35 (see FIG. 5) of a recommend candidate to the terminal device 4 based on the retrieval result.

Thereafter, in step S16, the control unit 14 determines whether the selection result on the selection information 35 is obtained from the terminal device 4. In such a processing, if it is determined that the selection result on the selection information 35 is obtained (Yes in step S16), the control unit 14 obtains the recommend information corresponding to the selection result from the recommend information DB 12 and transmits the recommend information to the terminal device 4 in step S17.

If the recommend information is obtained from the information providing device 2, the control unit 42 of the terminal device 4 displays the recommend information on the information display frame 32 of the moving image page 30 to display the recommend information on the display unit 44.

4. Modification Embodiment

In the above exemplary embodiment, the recommend information is transmitted from the information providing device 2 to the terminal device 4 in a push manner. However, the terminal device 4 may obtain the recommend information from the information providing device 2 in a pull manner. For example, if the moving image page 30 is a web page, a script which repeatedly requests the recommend information which is displayed on the information display frame 32 in the web page to the information providing device 2 is set. By doing this, the recommend information is repeatedly requested from the terminal device 4. When the recommend information is obtained, the information providing device 2 transmits the recommend information at a timing when there is a request from the terminal device 4.

Further, the control unit 14 of the information providing device 2 may obtain the image of the specific object included in the image of the moving image content before starting to distribute the moving image content and store the specific object table in which the image of the specific object is associated with a reproducing position in the content DB 11.

Specifically, the content obtaining unit 22 obtains a moving image content in which the specific object table is not set from the content DB 11. The content obtaining unit 22 reproduces the obtained moving image content and sequentially outputs the image of the moving image content together with the information on the reproducing time to the object recognizing unit 24. The object recognizing unit 24 sequentially extracts the image of the specific object which appears in the image of the moving image content and sets the image of the specific object in the specific object table of the content DB 11 together with the information on the corresponding reproducing time.

In the specific object table illustrated in FIG. 8, the reproducing position and the specific object information are associated with the content ID which is identification information of the moving image content. For example, in the moving image content of a content ID "10001", a name of a specific content which appears from two minutes three seconds after starting the reproduction to two minutes 21 seconds is "shoes" and the image thereof is stored in a folder of "/10001/image1/". Further, a name of a specific content which appears from three minutes 19 seconds to three minutes 54 seconds is "watch" and the image thereof is stored in a folder of "/10001/image2/".

As described above, after setting the specific object table, when the request obtaining unit 21 obtains a moving image content request, the content obtaining unit 22 obtains the moving image content corresponding to the moving image content request from the content DB 11. Further, the information distributing unit 23 obtains the information corresponding to the content ID of the obtained moving image content from the specific object table of the content DB 11. The information distributing unit 23 creates a script based on the information obtained from the specific object table and sets the script in the web page to create the moving image page 30. Such a script is a program which transmits a recommend information obtaining request (hereinafter, referred to as a recommend request) from the terminal device 4 immediately before or at a timing when the specific object appears (alternatively, a timing when the specific object disappears or immediately before the timing) to the information providing device 2.

For example, when the request obtaining unit 21 obtains the moving image content request corresponding to the content ID "10001" from the terminal device 4, a script, which is described to transmit the recommend request including information such as "two minutes three minutes" or "three minutes 19 seconds" and the content ID "10001" from the terminal device 4 to the information providing device 2 after starting to reproduce the moving image content in the terminal device 4, after two minutes three seconds, and after three minutes 19 seconds, is set in the moving image page 30.

Further, as information included in the recommend request, instead of the reproducing position, information identifying the reproducing position (for example, indicating an appearing order) may be used. Further, when the moving image content which is being reproduced in the terminal device 4 can be figured out, the content ID may not be included in the recommend request.

When the moving image page 30 in which the script is set as described above is obtained, the control unit 42 of the terminal device 4 performs the recommend request on the information providing device 2 in accordance with the script. When the request obtaining unit 21 obtains the recommend request, the content obtaining unit 22 obtains an image of the specific object corresponding to the recommend request from the content DB 11 based on the content ID included in the recommend request obtained by the request obtaining unit 21 and the information on the reproducing position.

The content obtaining unit 22 outputs the obtained image of the specific object to the similar image retrieving unit 25. The similar image retrieving unit 25 requests the similar image retrieval device 3 to retrieve the similar image with an image of the specific object obtained from the content obtaining unit 22 as a retrieval key and obtains a retrieval result from the similar image retrieval device 3.

The recommend information obtaining unit 26 obtains recommend information related with the image of the specific object which appears in the image of the moving image content which is being reproduced in the terminal device 4 from the recommend information DB 12, based on the retrieval result from the similar image retrieval device 3. The recommend information is output to the information distributing unit 23 and transmitted to the terminal device 4 by the information distributing unit 23.

Further, the recommend information obtaining unit 26 creates the selection information 35 as described above to transmit the created section information to the terminal device 4 and transmits the recommend information in accordance with the selection result to the terminal device 4.

Further, even when the recommend information is transmitted to the terminal device 4 in a push manner, it is possible to set the specific object table. By doing this, it is possible to reduce the processing load without performing the identification process of the specific object in the object recognizing unit 24 whenever the moving image content is distributed. In this case, the similar image retrieving unit 25 requests the similar image retrieval device 3 to retrieve the similar image with the image of the specific object corresponding to the reproducing position of the moving image content which is being distributed, as a retrieval key, based on the specific object table.

Further, in the above exemplary embodiment, the control unit 14 requests the similar image retrieval device 3 to retrieve the similar image with one of images of the specific objects which continuously appear as a retrieval key, but the invention is not limited to such a retrieval method.

For example, the control unit 14 may request the similar image retrieval device 3 to retrieve the similar image with a plurality of images among images of the specific objects which continuously appear as a retrieval key. In this case, the similar image retrieving unit 25 selects the plurality of images of the specific object among the images of the specific objects obtained from the content obtaining unit 22 and requests the similar image retrieval device 3 to retrieve the similar image with each of the selected images as a retrieval key.

The recommend information obtaining unit 26 collects the retrieval results by the similar image retrieval device 3 and combines the retrieval results and then extracts a name of the most common or a several number of upper level products or services and obtains the recommend information corresponding to the product or the service from the recommend information DB 12. By doing this, appropriate recommend information may be obtained.

Further, among the images of the specific objects which continuously appear, an image of a specific object which initially appears and an image of the specific object before disappearing may be considered as a retrieval key. By doing this, appropriate recommend information may be obtained while reducing the number of retrieval.

Further, in the above exemplary embodiment, the recommend information is displayed on the information display frame 32 of the moving image page 30, but the displaying destination of the recommend information is not limited to the information display frame 32. For example, the information distributing unit 23 accumulates the recommend information from the recommend information obtaining unit 26 during a predetermined time and inserts the accumulated recommend information in the moving image content as a commercial. In this case, the recommend information which is obtained from the content DB 11 by the recommend information obtaining unit 26 and output to the information distributing unit 23 may be considered as moving image information related with the product or the service.

Further, in the above exemplary embodiment, the control unit 14 displays the recommend information in the terminal device 4 in accordance with the reproducing position. However, regardless of the reproducing position, the control unit 14 may display the recommend information related with the image of the specific object in the terminal device 4. For example, the control unit 14 may display an object whose appearance number is equal to or higher than a predetermined number among the specific objects which appear in the moving image content randomly or in accordance with a predetermined rule in the terminal device 4.

Further, in the above exemplary embodiment, an image of a person to be extracted may be only an image of a specific person. In this case, the object recognizing unit 24, for example, obtains the information of a specific person (for example, a main character) who appears in the moving image content to be an extracting target of the specific object, from the content DB 11 and obtains an image of a specific person from the web site which is not illustrated, through the communication network 5, to set the obtained image in the first dictionary data.

The object recognizing unit 24 may obtain the image of the specific object from the image of the specific person only when the image of the person is an image of the specific person, based on the first dictionary data. By doing this, it is possible to efficiently present information regarding an item which is carried by the specific person to the user of the terminal device 4 as recommend information. Further, if it is possible to figure out a favorite person for the user from the attribute information of the user of the terminal device 4, the favorite person for the user is considered as a specific person and thus the recommend information may be efficiently presented to the user.

When the specific objects which are more than the information display frames 32 appear in the image of the moving image content in the same period, the control unit 14 may set recommend information related with the image of the specific object which has not appeared yet, in the information display frame 32.

Further, in the above exemplary embodiment, the information providing device 2 and the similar image retrieval device 3 may have separate configurations but the configuration of the similar image retrieval device 3 may be included in the information providing device 2.

Further, the similar image retrieval device 3 may retrieve the similar image with a web page which is provided in the shopping site as a posting source web page of the similar image. In the web page provided by the shopping site, an image of the product or the service may be included. Therefore, it is possible to precisely obtain information of the product or the service related with the specific object from the image of the specific object.

Further, in the above exemplary embodiment, it is described that the moving image content is distributed in a streaming manner. However, the moving image content may be downloaded to be distributed. In this case, the control unit 14, for example, adds the information (for example, information corresponding to the reproducing time) for transmitting the recommend request from the terminal device 4 at a timing when the specific object appears or immediately before the timing to the moving image content to transmit the added information to the terminal device 4.

Further, in the above exemplary embodiment, it has been described that the image is extracted or the similar image is retrieved based on the feature vector. However, image similarity determination is not limited to this method, but various methods may be used.

Further, in the above exemplary embodiment, the information providing device 2 transmits the moving image content, but the moving image content may be transmitted from a content server which is separated from the information providing device 2.

In the above exemplary embodiment, the control unit 14 may set the information in the moving image page 30 so as to clearly define that the recommend information is information related with the moving image content. Further, in the case of the recommend information related with the image of the specific object extracted from the image of the specific person, the control unit 14 may set the information in the moving image page 30 so as to clearly define that the recommend information is information of the product which is carried by the specific person.

5. Effect

As described above, in the information providing device 2 according to an exemplary embodiment, the object recognizing unit 24 extracts an image of a specific object which appears in the image of the moving image content which will be distributed to the terminal device 4, the similar image retrieving unit 25 an example of a retrieving unit) requests the similar image retrieval device 3 (an example of a retrieving device) to retrieve a similar image with the image of the specific object extracted by the object recognizing unit 24 as a retrieval key, the retrieval result is obtained from the similar image retrieval device 3, the recommend information obtaining unit 26 (an example of an obtaining unit) obtains recommend information related with the image of the specific object which appears in the image of the moving image content based on the retrieval result obtained by the similar image retrieving unit 25, and the information distributing unit 23 (an example of a transmitting unit) transmits the recommend information obtained by the recommend information obtaining unit 26 to the terminal device 4.

As described above, in the information providing device 2 according to the exemplary embodiment, the similar image is retrieved with the image of the specific object as a retrieval key and recommend information related with the image of the specific object which appears in the image of the moving image content which is being reproduced in the terminal device 4 is obtained based on the retrieval result. By doing this, it is possible to present appropriate recommend information corresponding to an image of the moving image content to the user. That is, in the information providing device 2 according to the exemplary embodiment, it is possible to obtain specific information of a specific object which is hardly obtained only by the object recognizing process. Therefore, appropriate recommend information in accordance with the specific object may be displayed in the terminal device 4.

Further, in the information providing device 2 according to the exemplary embodiment, the object recognizing unit 24 extracts the image of the specific object from the image of the person after extracting an image of a person who appears in the image of the moving image content.

By doing this, in the information providing device 2 according to the exemplary embodiment, the specific object related with the person who appears in the image of the moving image contents may be easily extracted. Further, a product related with the person in which the user of the terminal device 4 is interested may be extracted so that more appropriate recommend information may be provided to the user of the terminal device 4. Further, if it is possible to figure out a favorite person for the user from the attribute information of the user of the terminal device 4, the favorite person for the user is considered as a person to be extracted and thus the recommend information may be efficiently presented to the user.

Further, in the information providing device 2 according to the exemplary embodiment, the information distributing unit 23 transmits the recommend information related with the image of the specific object to the terminal device 4 so as to be displayed in the terminal device 4 at a timing when the image of the specific object appears in a reproducing image of the moving image content in the terminal device 4 or at a timing when the image of the specific object disappears from the reproducing image.

By doing this, in the information providing device 2 according to the exemplary embodiment, the recommend information may be displayed in the terminal device 4 at an appropriate timing which is synchronization with an appearing timing of the image of the specific object and it is possible to increase an interest of the user for the recommend information.

Further, in the information providing device 2 according to the exemplary embodiment, the recommend information obtaining unit 26 (an example of a selection information transmitting unit, a selection result obtaining unit, and a recommend information obtaining unit) transmits the selection information 35 of the recommend candidate to the terminal device 4 based on the retrieval result by the similar image retrieving unit 25 and then obtains the selection result on the selection information 35 from the terminal device 4, and obtains the recommend information corresponding to the selection result.

By doing this, in the information providing device 2 according to the exemplary embodiment, the recommend information which has a higher relativeness with the image of the specific object may be displayed in the terminal device 4 and it is possible to increase an interest of the user for the recommend information.

Further, in the information providing device 2 according to the exemplary embodiment, the information distributing unit 23 distributes the moving image content to the terminal device 4 in a streaming manner and the object recognizing unit 24 extracts the specific object from the image of the moving image content which is being distributed to the terminal device 4.

By doing this, in the information providing device 2 according to the exemplary embodiment, it is possible to extract the specific object image in synchronization with the streaming distribution so that for example, appropriate recommend information may be transmitted to the terminal device 4 even when the moving image content is a posting content.

Furthermore, in the information providing device 2 according to the exemplary embodiment, the content DB 11 (corresponds to an example of a storing unit) stores a specific object table in which the image of the specific object extracted by the object recognizing unit 24 and the reproducing position of the moving image content from which the specific object is extracted are associated to each other and the object recognizing unit 24 obtains the image of the specific object corresponding to the reproducing position of the moving image content from the specific object table of the content DB 11, and retrieves the similar image with the obtained image of the specific object as a retrieval key.

By doing this, in the information providing device 2 according to the exemplary embodiment, if the contents are same moving image contents, after extracting the specific object image, it does not need to perform the extracting process of the specific objet image so that the processing load of the control unit 14 may be reduced. Further, the image of the specific object is stored and the similar image is retrieved as needed so that the newest information related with the specific object may be obtained.

Further, in the information providing device 2 according to the exemplary embodiment, based on the specific object table, the script which transmits the recommend request from the terminal device 4 at a timing when the specific object appears or immediately before the timing is set in the moving image page 30 and thus it is possible to provide the recommend information to the terminal device 4 at an appropriate timing based on the request from the terminal device 4.

According to an aspect of an exemplary embodiment, an information providing device and an information providing method which are capable of presenting appropriate recommend information corresponding to a moving image of the moving image content to a user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information providing device that communicates with a terminal device via a network, the information providing device comprising: a processor operatively coupled to a memory, wherein the processor is configured to:
   recognize an image of a specific object which appears in an image of a moving image content to be distributed to the terminal device via the network;
   request a retrieval device to retrieve similar images that are similar to the image of the specific object as a retrieval key;
   obtain a retrieval result from the retrieval device, the retrieval result including at least two or more different web addresses, each of the two or more different web addresses being an address of a webpage in which an image that is similar to the image of the specific object is posted;
   determine content that is common between webpages of the two or more different web addresses;
   obtain recommend candidates based on the content that is common between the webpages containing at least one similar image;
   transmit, via the network, selection information including information on the recommend candidates to the terminal device;
   obtain a selection result with respect to the selection information from the terminal device via the network, the selection result including information on one or more recommend candidates selected from the recommend candidates;
   obtain recommend information corresponding to the selected one or more recommend candidates; and
   transmit the recommend information to the terminal device via the network in accordance with a temporal reproducing position.

2. The information providing device according to claim 1, wherein the processor is further configured to extract the image of the specific object from an image of a person who appears in the moving image content after extracting the image of the person who appears in the image of the moving image content.

3. The information processing device according to claim 2, wherein the processor is further configured to:
   recognize a specific person among persons appearing in the moving image content, and
   obtain the image of the specific object from the image of the specific person.

4. The information providing device according to claim 1, wherein the processor is further configured to transmit the recommend information to the terminal device so as to be displayed in the terminal device at a timing when the image of the specific object appears in a reproducing image of the moving image content in the terminal device or at a timing when the image of the specific object disappears from the reproducing image.

5. The information providing device according to claim 1, wherein the processor is further configured to:
   transmit the moving image content to the terminal device in a streaming manner; and recognize the specific object from the image of the moving image content which is being distributed to the terminal device.

6. The information providing device according to claim 1, wherein the memory is configured to store the image of the specific object and a temporal reproducing position of the moving image content from which the image of the specific object is recognized, so as to be associated with each other, and the processor is further configured to:

obtain the image of the specific object in accordance with the temporal reproducing position stored in the memory.

7. The information processing device according to claim 1, wherein the temporal reproducing position indicates an order of appearance of the image included in the moving image content.

8. The information processing device according to claim 1, wherein the processor is further configured to transmit the recommend information to the terminal device before the image of the specific object appears in a reproducing image of the moving image content in the terminal device.

9. The information processing device according to claim 1, wherein the processor is further configured to recognize the specific object in accordance with attribute information of a user of the terminal device.

10. The information processing device according to claim 1, wherein the processor is further configured to:

(i) collect web pages of the two or more different web addresses, and (ii) determine the recommend information based on the collected web pages.

11. The information processing device according to claim 1, wherein the processor is further configured to retrieve the similar image with a plurality of images among images of specific objects which continuously appear in the moving image content as the retrieval key.

12. An information providing method which is executed by a computer, the method comprising:

recognizing an image of a specific object which appears in an image of a moving image content to be distributed to a terminal device via a network;

requesting a retrieval device to retrieve similar images that are similar to the extracted image of the specific object as a retrieval key;

obtaining a retrieval result from the retrieval device, the retrieval result including at least two or more different web addresses, each of the two or more different web addresses being an address of a webpage containing an image that is similar to the image of the specific object;

determining content that is common between webpages of the two or more different web addresses;

obtaining recommend candidates based on the content that is common between the webpages containing at least one similar image;

transmitting, via the network, selection information including information on the recommend candidates to the terminal device;

obtaining, via the network, a selection result with respect to the selection information from the terminal device, the selection result including information on one or more recommend candidates selected from the recommend candidates;

obtaining recommend information corresponding to the selected one or more recommend candidates; and transmitting the obtained recommend information via the network in accordance with a temporal reproducing position to the terminal device.

13. A non-transitory computer readable storage medium containing program instructions, wherein execution of the program instructions by one or more processors of a computer system causes the one or more processors to:

recognize an image of a specific object which appears in an image of a moving image content to be distributed to a terminal device via a network;

request a retrieval device to retrieve similar images that are similar to the extracted image of the specific object as a retrieval key;

obtain a retrieval result from the retrieval device, the retrieval result including at least two or more different web addresses, each of the two or more different web addresses being an address of a webpage in which an image that is similar to the image of the specific object is posted;

determine content that is common between webpages of the two or more different web addresses;

obtain recommend candidates based on the content that is common between the webpages containing at least one similar image;

transmit, via the network, selection information including information on the recommend candidates to the terminal device;

obtain, via the network, a selection result with respect to the selection information from the terminal device, the selection result including information on one or more recommend candidates selected from the recommend candidates;

obtain recommend information corresponding to the selected one or more recommend candidates; and transmit the obtained recommend information via the network in accordance with a temporal reproducing position to the terminal device.

14. An information providing device that communicates with a terminal device via a network, the information providing device comprising: a processor operatively coupled to a memory, wherein the processor is configured to:

recognize an image of a specific object which appears in an image of a moving image content to be distributed to the terminal device via the network;

request a retrieval device to retrieve similar images that are similar to the image of the specific object as a retrieval key;

obtain a retrieval result from the retrieval device, the retrieval result including at least two or more different web addresses, each of the two or more different web addresses being an address of a webpage where an image that is similar to the image of the specific object is posted;

determine content that is common between webpages of the two or more different web addresses;

obtain recommend information based on the content that is common between the webpages containing at least one similar image; and transmit the recommend information to the terminal device via the network in accordance with a temporal reproducing position.

* * * * *